United States Patent
Liu et al.

(10) Patent No.: US 11,374,439 B2
(45) Date of Patent: Jun. 28, 2022

(54) ELECTRONIC DEVICE AND CONTROL METHOD

(71) Applicant: MERRY ELECTRONICS (SHENZHEN) CO., LTD., Guangdong (CN)

(72) Inventors: Yung-Hsiang Liu, Taichung (TW); Ying-Hui Ho, Taichung (TW); Ke-Yang Lai, Taichung (TW)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 324 days.

(21) Appl. No.: 16/854,886

(22) Filed: Apr. 21, 2020

(65) Prior Publication Data
US 2021/0119495 A1 Apr. 22, 2021

(30) Foreign Application Priority Data
Oct. 17, 2019 (TW) ................................ 108137547

(51) Int. Cl.
| | |
|---|---|
| *H02J 7/00* | (2006.01) |
| *H02J 50/70* | (2016.01) |
| *H02J 50/80* | (2016.01) |
| *G10L 15/22* | (2006.01) |
| *G10L 15/26* | (2006.01) |
| *H04B 1/3888* | (2015.01) |

(52) U.S. Cl.
CPC .............. *H02J 50/70* (2016.02); *G10L 15/22* (2013.01); *G10L 15/26* (2013.01); *H02J 50/80* (2016.02); *H04B 1/3888* (2013.01); *G10L 2015/223* (2013.01)

(58) Field of Classification Search
USPC .......................... 320/106, 107, 108, 109, 110
See application file for complete search history.

(56) References Cited

U.S. PATENT DOCUMENTS

| | | | |
|---|---|---|---|
| 2016/0118179 A1* | 4/2016 | Park ................... | H01F 27/2871 |
| | | | 320/108 |
| 2021/0373596 A1* | 12/2021 | Murch .............. | H04M 1/72412 |

FOREIGN PATENT DOCUMENTS

CN   214900933 U  * 11/2021

* cited by examiner

*Primary Examiner* — Brian Ngo
(74) *Attorney, Agent, or Firm* — CKC & Partners Co., LLC

(57) ABSTRACT

An electronic device includes a case body, a wireless transmission circuit, a voice processing circuit, a control circuit, and a wireless charging circuit. The case body is configured to hold an external electronic device. The wireless transmission circuit is configured to wirelessly connect the external electronic devices. The voice processing circuit is configured to generate a voice command according to a voice signal, and transmit the voice command to the external electronic devices. The wireless charging circuit is configured to couple the external electronic device to receive a first voltage, and convert the first voltage to a storage voltage to supply power to the control circuit, the wireless transmission circuit, and the voice processing circuit.

20 Claims, 5 Drawing Sheets

ELECTRONIC DEVICE AND CONTROL METHOD

CROSS-REFERENCE TO RELATED APPLICATION

This application claims priority to Taiwan Application Serial Number 108137547, filed Oct. 17, 2019, which is herein incorporated by reference in its entirety.

BACKGROUND

Technical Field

The present disclosure relates to an electronic device, and more particularly, to a control method for wireless transmission and voltage protection.

Description of Related Art

Most of the electronic device protective shells on the market are only suitable for corresponding electronic devices, and provide relatively few functions. In addition, there are no other related functions designed for the system platform, which cannot meet the needs of various electronic devices, causing inconvenience to users and waste of unnecessary costs.

SUMMARY

One aspect of the present disclosure is an electronic device, including a case body, a wireless transmission circuit, a voice processing circuit, a control circuit and a wireless charging circuit. The case body is configured to hold an external electronic device. The external electronic device is configured to perform a program to perform an operation in response to a voice command. The wireless transmission circuit is arranged on the case body, and is configured to wirelessly connect to the external electronic device. The voice processing circuit is arranged on the case body. The voice processing circuit is configured to generate the voice command according to a voice signal, and the voice command is transmitted by the wireless transmission circuit to the external electronic device. The control circuit is arranged on the case body. The wireless charging circuit is arranged on the case body, and is coupled to the external electronic device to receive a first voltage. The wireless charging circuit is further configured to convert the first voltage to a storage voltage to supply power to the control circuit, the wireless transmission circuit and the voice processing circuit. The control circuit is configured to control the wireless charging circuit according to the storage voltage and a load of the wireless transmission circuit and the voice processing circuit.

Another aspect of the present disclosure is a control method, including: wirelessly connecting to an external electronic device by a wireless transmission circuit, wherein the external electronic device is configured to perform a program to perform an operation in response to a voice command; generating a voice command according to a voice signal by a voice processing circuit, and transmitting the voice command to the external electronic device by the wireless transmission circuit; coupling to the external electronic device by a wireless charging circuit to receive a first voltage, and converting the first voltage to a storage voltage to supply power to a control circuit, the wireless transmission circuit and the voice processing circuit; and controlling the wireless charging circuit by the control circuit according to the storage voltage and a load of the wireless transmission circuit the voice processing circuit, wherein the wireless transmission circuit, the voice processing circuit, the wireless charging circuit and the control circuit are arranged on a case body, and the case body is configured to hold the external electronic device.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

In the present disclosure, the terms first, second, third, etc. are used to describe various elements, components, regions, layers, and/or blocks that are understandable. However, these elements, components, regions, layers and/or blocks should not be limited by these terms. These terms are limited to identifying single elements, components, regions, layers, and/or blocks. Therefore, a first element, component, region, layer, and/or block in the following disclosure may also be referred to as a second element, component, region, layer, and/or block without departing from the intention of the present case.

In the present disclosure, unless the present disclosure specifically restricts the article, "a" and "the" can refer to a single or multiple. It will be further understood that the terms "comprising", "including", "having" and similar words used in the present disclosure indicate the features, regions, integers, steps, operations, elements and/or components recorded therein, but do not exclude It describes or additionally one or more of its other features, regions, integers, steps, operations, elements, components, and/or groups thereof.

Unless otherwise defined, all terms (including technical and scientific terms) used herein have their ordinary meanings, which can be understood by those familiar with the field. Furthermore, the definitions of the above vocabularies in commonly used dictionaries should be interpreted in the contents of this specification as meanings consistent with the relevant fields of the case. Unless specifically defined, these terms will not be interpreted as idealized or overly formal.

The embodiments below described in detail with the accompanying drawings are not provided to limit the scope of the present disclosure. Moreover, the operation of the described structure is not for limiting the order of implementation. Any device with equivalent functions that is produced from a structure formed by a recombination of elements is covered by the scope of the present disclosure. The drawings are for the purpose of illustration only, and not drawn in accordance with the original size.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. As used herein, the term "and/or" is used to mean that either or both of the associated listed items may be affected or involved.

Figure 1A:
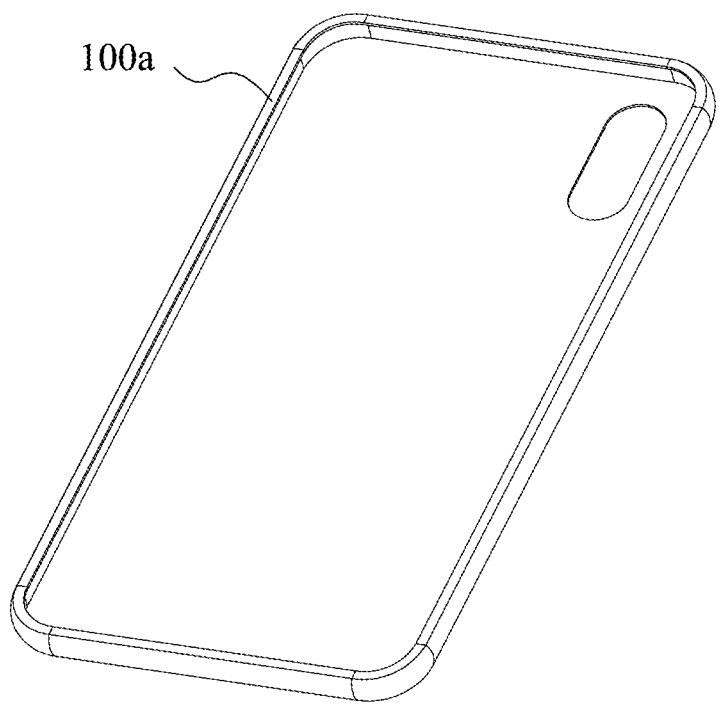
FIG. 1A is a schematic diagram of an electronic device in some embodiments of the present disclosure.
Figure 1B:
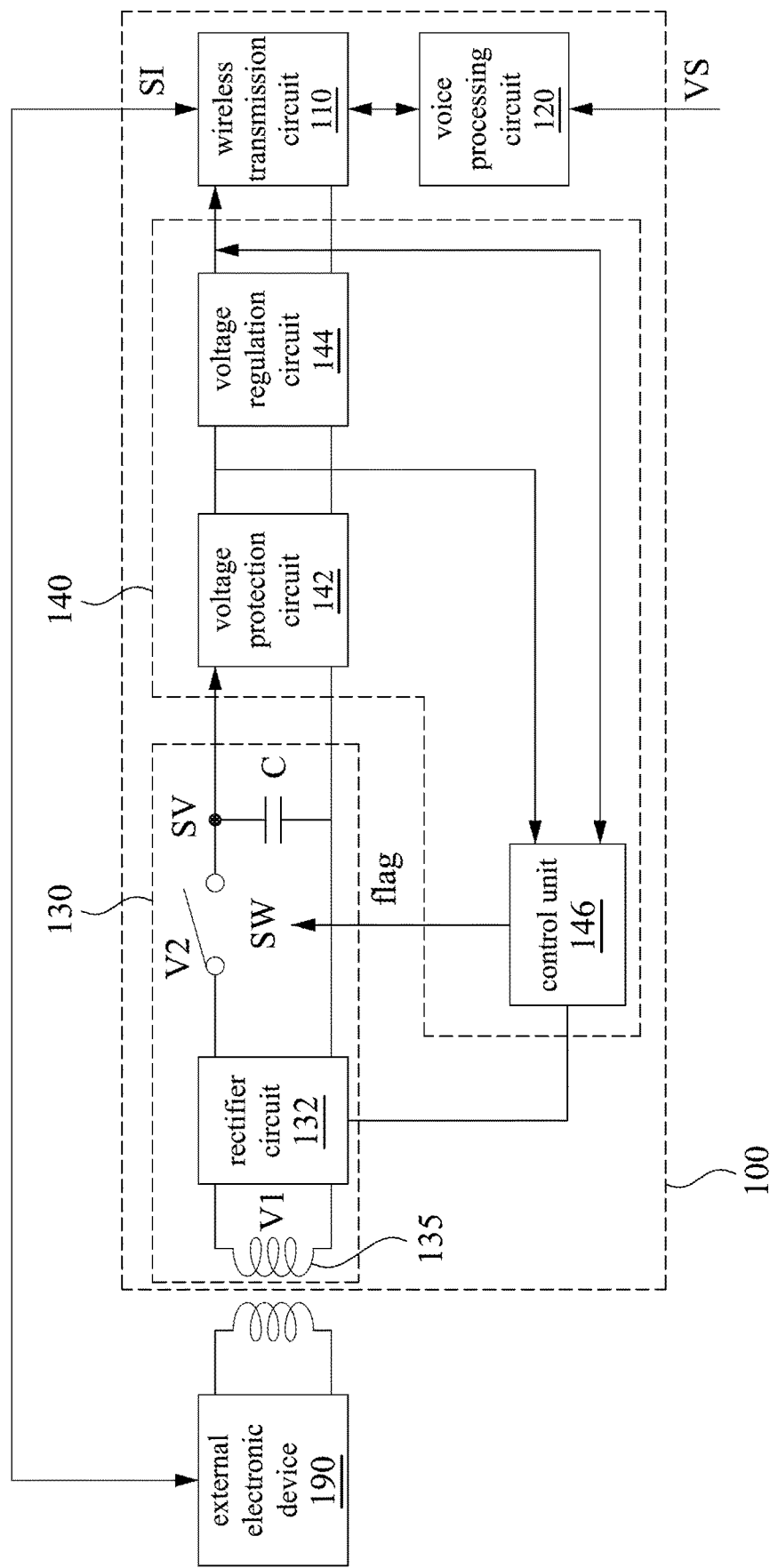
FIG. 1B is a block diagram of internal components of the electronic device in some embodiments of the present disclosure.

Reference is made to FIG. 1A and FIG. 1B, in which FIG. 1A is a schematic diagram of an electronic device in some embodiments of the present disclosure, and FIG. 1B is a block diagram of internal components of the electronic device in some embodiments of the present disclosure. The electronic device 100 includes a case body 100a, configured to hold an external electronic device 190. The external electronic device 190 is configured to operate a corresponding program, and is configured to operate the electronic device 100 in response to a voice command SI.

Referring to FIG. 1B, the electronic device 100 includes a wireless transmission circuit 110, a voice processing circuit 120, a wireless charging circuit 130 and a control circuit 140. The wireless transmission circuit 110 is arranged on the case body, and configured to wirelessly connect to the external electronic device 190. The voice processing circuit 120 is arranged on the case body, and is configured to generate the voice command SI according to the voice signal VS, and is further configured to transmit the voice command SI to the external electronic device 190 by the wireless transmission circuit 110.

In some embodiments, the wireless charging circuit 130 is arranged on the case body, and configured to be coupled to the external electronic device 190 receive a first voltage V1, and configured to convert the first voltage V1 to a storage voltage SV, so as to supply power to the control circuit 140, the wireless transmission circuit 110 and the voice processing circuit 120. The control circuit 140 is configured to control the wireless charging circuit 130 according to the storage voltage SV and a load L. In some embodiments, the load L is power consumption of the wireless transmission circuit 110 and the voice processing circuit 120.

In some embodiments, the wireless charging circuit 130 further includes a capacitor C, a rectifier circuit 132 and a switching circuit SW. The rectifier circuit 132 is configured to rectify the first voltage V1 into the second voltage V2. The switching circuit SW is configured to be turn on according to the control command flag to charge the capacitor C with the second voltage C2 and generate the storage voltage SV. The above mentioned structure of the wireless charging circuit 130 is merely an example, and other elements in the wireless charging circuit 130 are also within the scope of the present disclosure. For example, in some other embodiments, the wireless charging circuit 130 further includes a wireless receiving coil 135. The wireless receiving coil 135 is configured to sense the energy of the external electronic device 190 and generate corresponding voltage and current accordingly.

In some embodiments, the control circuit 140 further includes a voltage protection circuit 142, a voltage regulation circuit 144 and a control unit 146. The control unit 146 is configured to detect the storage voltage SV, and generate the control command flag to turn on or turn off the wireless charging circuit 130. The voltage protection circuit 142 is used to the second capacitor voltage protection mechanism, which is turned off the wireless charging circuit 130 when the control unit 146 fails to ensure the entire circuit safety. The voltage regulation circuit 144 is configured to operate at a low power mode or a normal mode according to the load L, so as to regulate the storage voltage SV to supply power to the wireless transmission circuit 110 and the voice processing circuit 120. The power of the voltage regulation circuit 144 operating in the low power mode is lower than the power of the voltage regulation circuit 144 operating in the normal mode.

In some embodiments, the electronic device 100 includes an electronic device case body 100a configured to hold the external electronic device 190, and connect to each other through the wireless transmission. The external electronic device 190 includes devices with wireless transmission functions such as mobile phones, music players and tablets computer, and wireless transmission functions can be Bluetooth, infrared, Wi-Fi, RFID or ZigBee wireless connection functions. In some embodiments, the electronic device 100 and the held external electronic device can mutually confirm each other's identity based on the Bluetooth connection for data exchange. For example, after the electronic device 100 receives the voice signal VS from a user, the voice processing circuit 120 generates the voice command SI according to the voice signal VS, and then uses Bluetooth to transmit the voice command SI to the external electronic device.

In some embodiments, the voice processing circuit 120 includes a microphone to receive the voice signal VS from a user. Accordingly, the electronic device 100 can be provided with a button (not shown) correspondingly, so that when the user wants to speak, press and hold the button to speak or record.

In some embodiments, the external electronic device 190 installs a program to process the voice command SI from the voice processing circuit 120. The program can identify the voice command SI to perform related functions, or remotely control Internet of Things application services through voice. For example, the external electronic device 190 installs the program of a voice assistant function, and the user inputs a request to turn on the electric lamp to the electronic device 100 holding the external electronic device 190. At this time, the voice processing circuit 120 will generate the corresponding voice command SI according to the request and transmit the corresponding voice command SI to the external electronic device 190. The external electronic device 190 transmits the received voice command SI to the program of the voice assistant function for processing, so as to remotely control the electric lamp with the ability to connect to the Internet through the cloud server, but the present disclosure is not limited to this. Any device with the ability to connect to the Internet can provide voice-controlled services without the need to directly operate the external electronic device 190 (e.g., wake up and unlock of the external electronic device 190, etc.) through the combination of the electronic device 100 and the external electronic device 190 to improve the convenience of use.

In some embodiments, the wireless charging circuit 130 receives electric power from the external electronic device 190 to enable the electronic device 100 to provide Bluetooth connection and voice receiving function.

In some embodiments, any external electronic device 190 that has installed the voice assistant program is compatible with the voice command SI output by the voice processing circuit 120.

In some embodiments, the electronic device 100 includes a universal serial bus (not shown) for the external electronic device 190 to connect, and it is convenient for two different electronic devices to transmit power, files, images and audio data to each other.

Figure 2:
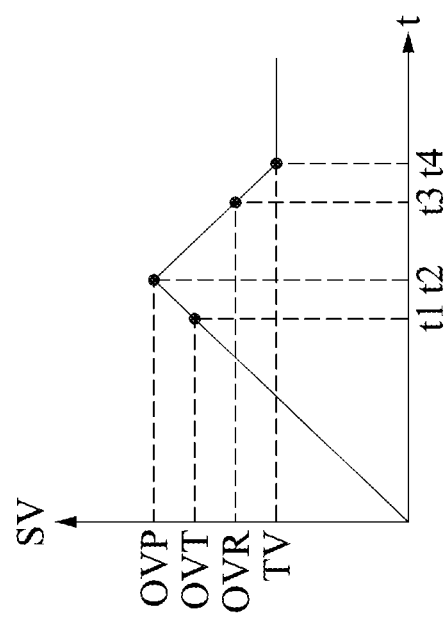
FIG. 2 is a coordinate diagram of the overvoltage protection in some embodiments of the present disclosure.

FIG. 2 is a coordinate diagram of the overvoltage protection in some embodiments of the present disclosure. The vertical axis in FIG. 2 is the storage voltage SV, and the horizontal axis in FIG. 2 is time t. The wireless charging circuit 130 is turned on according to the control command flag generated by the control unit 146 to convert the first voltage V1 to the second voltage V2, and store the second voltage V2 in the capacitor C, so that the storage voltage SV continues to increase linearly, as shown in the trend between the initial time and time t2 in FIG. 2. At this time, the control unit 146 continuously detects the storage voltage SV in the capacitor C, and determines whether it is higher than or equal to the overvoltage threshold voltage value OVT. If the storage voltage SV is higher than or equal to the overvoltage threshold voltage value OVT at time t1, the control unit 146 will detect whether the storage voltage SV is higher than or equal to the overvoltage protection voltage value OVP again.

In some embodiments, when the storage voltage SV is higher than or equal to the overvoltage protection voltage value OVP at time t2, the control unit 146 provides an overvoltage protection and transmits the control command flag to turn off the switching circuit to stop the wireless charging circuit 130 from charging the capacitor C. The overvoltage protection voltage value OVP is higher than the overvoltage threshold voltage value OVT. There is a delay time between time t1 and time t2 to provide the control unit 146 with sufficient buffer time to periodically detect the storage voltage SV. By setting the overvoltage threshold voltage value OVT and the overvoltage protection voltage value OVP, the storage voltage SV can be prevented from exceeding an acceptable range and causing damage to the capacitor C.

In some embodiments, when the wireless charging circuit 130 stops charging the capacitor C, the storage voltage SV starts to decrease, as shown in the trend between time t2 and time t4 in FIG. 2. The storage voltage SV is expected to have a target voltage value TV. When the wireless charging circuit 130 stops charging the capacitor C, the control unit 146 will detect whether the storage voltage SV is lower than or equal to the overvoltage recovery voltage value OVR. If the storage voltage SV is lower than or equal to the overvoltage recovery voltage value OVR at time t3, the control unit 146 will detect again whether the storage voltage SV is lower than or equal to the target voltage value TV.

In some embodiments, when the storage voltage SV is lower than or equal to the target voltage value TV at time t4, the control unit 146 releases the overvoltage protection. The overvoltage recovery voltage value OVR is higher than the target voltage value TV. There is a delay time between time t3 and time t4, providing the control unit 146 with sufficient buffer time to periodically detect the storage voltage SV. By setting the overvoltage recovery voltage value OVR and the target voltage value TV, the storage voltage SV can be avoided causing circuit operation errors due to not reaching the expected voltage value.

Figure 3:
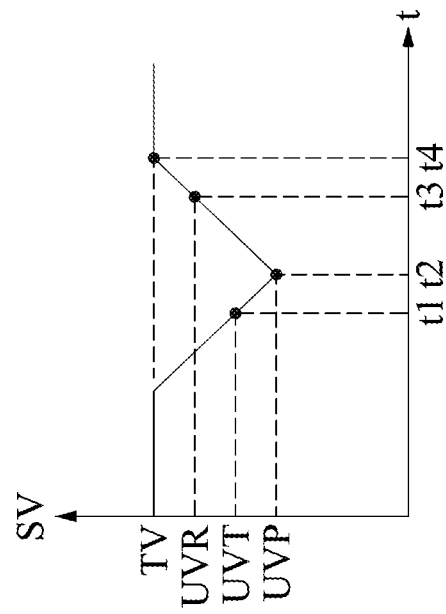
FIG. 3 is a coordinate diagram of the undervoltage protection in some embodiments of the present disclosure.

FIG. 3 is a coordinate diagram of the undervoltage protection in some embodiments of the present disclosure. The vertical axis in FIG. 3 is the storage voltage SV, and the horizontal axis in FIG. 3 is time t. The wireless charging circuit 130 is turned on according to the control command flag generated by the control unit 146 to convert the first voltage V1 to the second voltage V2, and stores the second voltage V2 in the capacitor C. As shown in FIG. 3, when the storage voltage SV of the capacitor C supplies power the control circuit 140, the wireless transmission circuit 110 and the voice processing circuit 120, the storage voltage SV will continue to decrease linearly. To avoid the storage voltage SV being too low, the control unit 146 will check the storage voltage SV of the capacitor C.

In some embodiments, the control unit 146 detects whether the storage voltage SV is lower than or equal to the undervoltage threshold voltage value UVT. If the storage voltage SV is lower than or equal to the undervoltage threshold voltage value UVT at time t1, the control unit 146 will detect whether the storage voltage SV is lower than or equal to the undervoltage protection voltage value UVP again.

In some embodiments, when the storage voltage SV is lower than or equal to the undervoltage protection voltage value UVP at time t2, the control unit 146 provides an undervoltage protection, and transmits the control command flag to turn on the switching circuit, so as to drive the wireless charging circuit 130 charging to the capacitor C. The undervoltage threshold voltage value UVT is higher than the undervoltage protection voltage value UVP. There is a delay time between time t1 and time t2 to provide the control unit 146 with sufficient buffer time when periodically detecting the storage voltage SV. By setting the undervoltage threshold voltage value UVT and the undervoltage protection voltage value UVP, the storage voltage SV can be avoided from abnormal operation due to the circuit being lower than an acceptable range.

In some embodiments, when the wireless charging circuit 130 starts charging the capacitor C, the storage voltage SV starts to increase, as shown in the trend between time t2 and time t4 in FIG. 3. The storage voltage SV is expected to have a target voltage value TV. When the wireless charging circuit 130 starts to charge the capacitor C, the control unit 146 will detect whether the storage voltage SV is higher than or equal to the undervoltage recovery voltage value UVR. If the storage voltage SV is higher than or equal to the undervoltage recovery voltage value UVR at time t3, the control unit 146 will detect whether the storage voltage SV is higher than or equal to the target voltage value TV again.

In some embodiments, when the storage voltage SV is higher than or equal to the target voltage value TV at time t4, the control unit 146 releases the undervoltage protection. The target voltage value TV is higher than the undervoltage recovery voltage value UVR. There is a delay time between time t3 and time t4 to provide the control unit 146 with sufficient buffer time when periodically detecting the storage voltage SV. By setting the undervoltage recovery voltage value UVR and the target voltage value TV, the storage voltage SV can be avoided operational errors due to storage voltage SV not reaching the expected voltage value.

In some embodiments, the electronic device 100 is configured to hold the external electronic device 190, and is compatible with the program of different voice assistant functions. Accordingly, cooperating with the relevant mechanisms of the overvoltage protection and the undervoltage protection, it ensures that the electric power of the electronic device 100 is in a proper range to improve the stability of the circuit operation.

Figure 4:
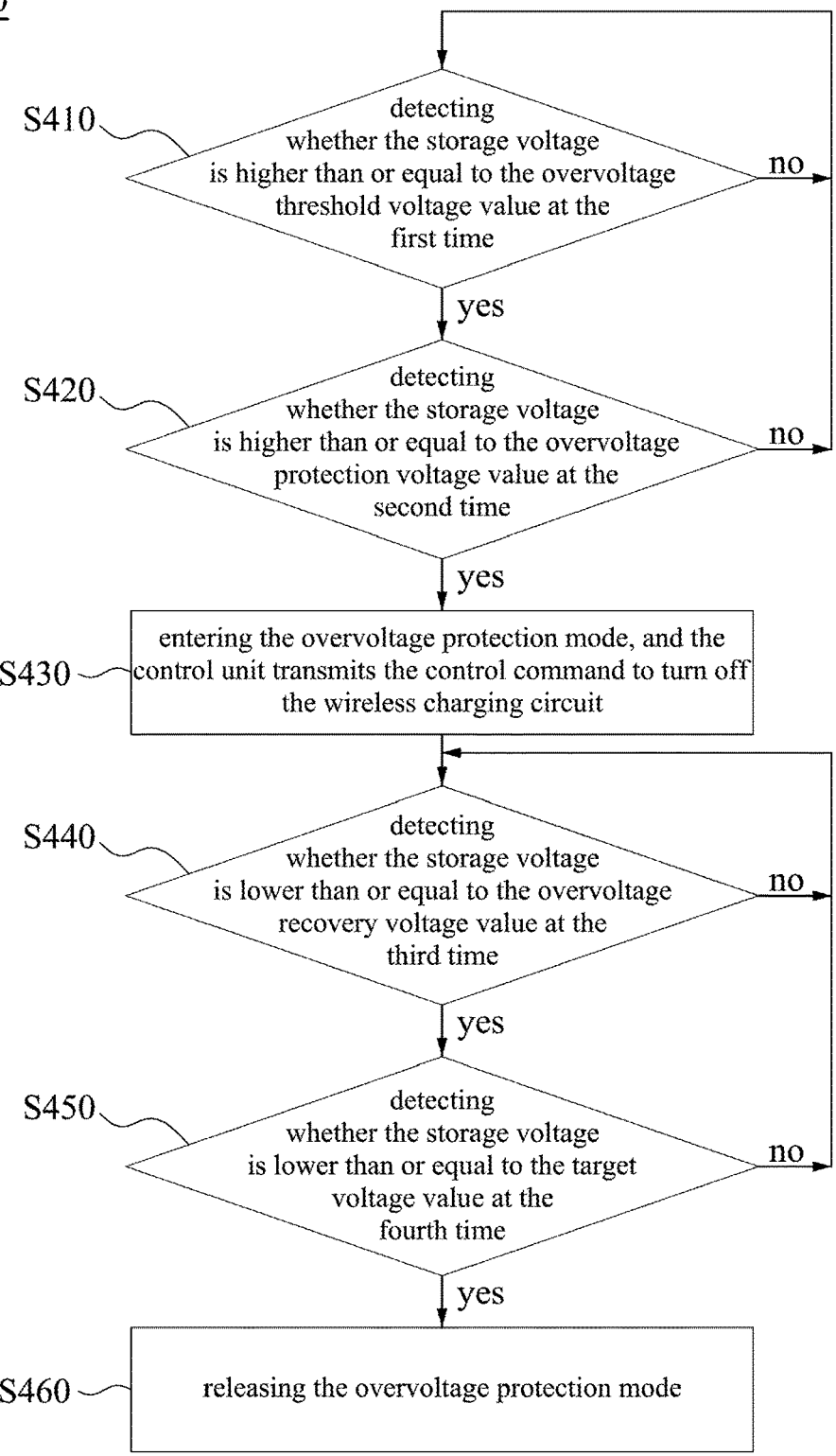
FIG. 4 is a flowchart illustrating an overvoltage projection method in some embodiments of the present disclosure.

FIG. 4 is a flowchart illustrating an overvoltage projection method in some embodiments of the present disclosure. For convenience of explanation, the overvoltage protection method 400 will be described with reference to the aforementioned FIG. 1A to FIG. 3. In some embodiments, the overvoltage protection method 400 can be applied to the capacitor voltage protection and power control to improve the safety of the capacitor charging and discharging.

In step S410, the control unit 146 detects whether the storage voltage SV is higher than or equal to the overvoltage threshold voltage value OVT at the first time (time t1). If the storage voltage SV is lower than the overvoltage threshold voltage value OVT, perform step S410 again. If the storage voltage SV is higher than or equal to the overvoltage threshold voltage value OVT, perform step S420.

In step S420, the control unit 146 detects whether the storage voltage SV is higher than or equal to the overvoltage protection voltage value OVP at the second time (time t2). If the storage voltage SV is lower than the overvoltage protection voltage value OVP, perform step S410 again. If the storage voltage SV is higher than or equal to the overvoltage protection voltage value OVP, perform step S430 to enter the overvoltage protection mode.

In step S430, the control unit 146 provides the overvoltage protection, and transmits the control command flag to turn off the wireless charging circuit 130.

In step S440, the control unit 146 detects whether the storage voltage is lower than or equal to the overvoltage recovery voltage value OVR at the third time (time t3). If the storage voltage SV is higher than the overvoltage recovery voltage value OVR, perform step S440 again. If the storage voltage SV is lower than or equal to the overvoltage recovery voltage value OVR, perform step S450.

In step S450, the control unit 146 detects whether the storage voltage is lower than or equal to the target voltage value TV at the fourth time (time t4). If the storage voltage SV is higher than the target voltage value TV, perform step S440 again. If the storage voltage SV is lower than or equal to the target voltage value TV, perform step S460 to release the overvoltage protection mode.

In step S460, the control unit 146 releases the overvoltage protection.

Figure 5:
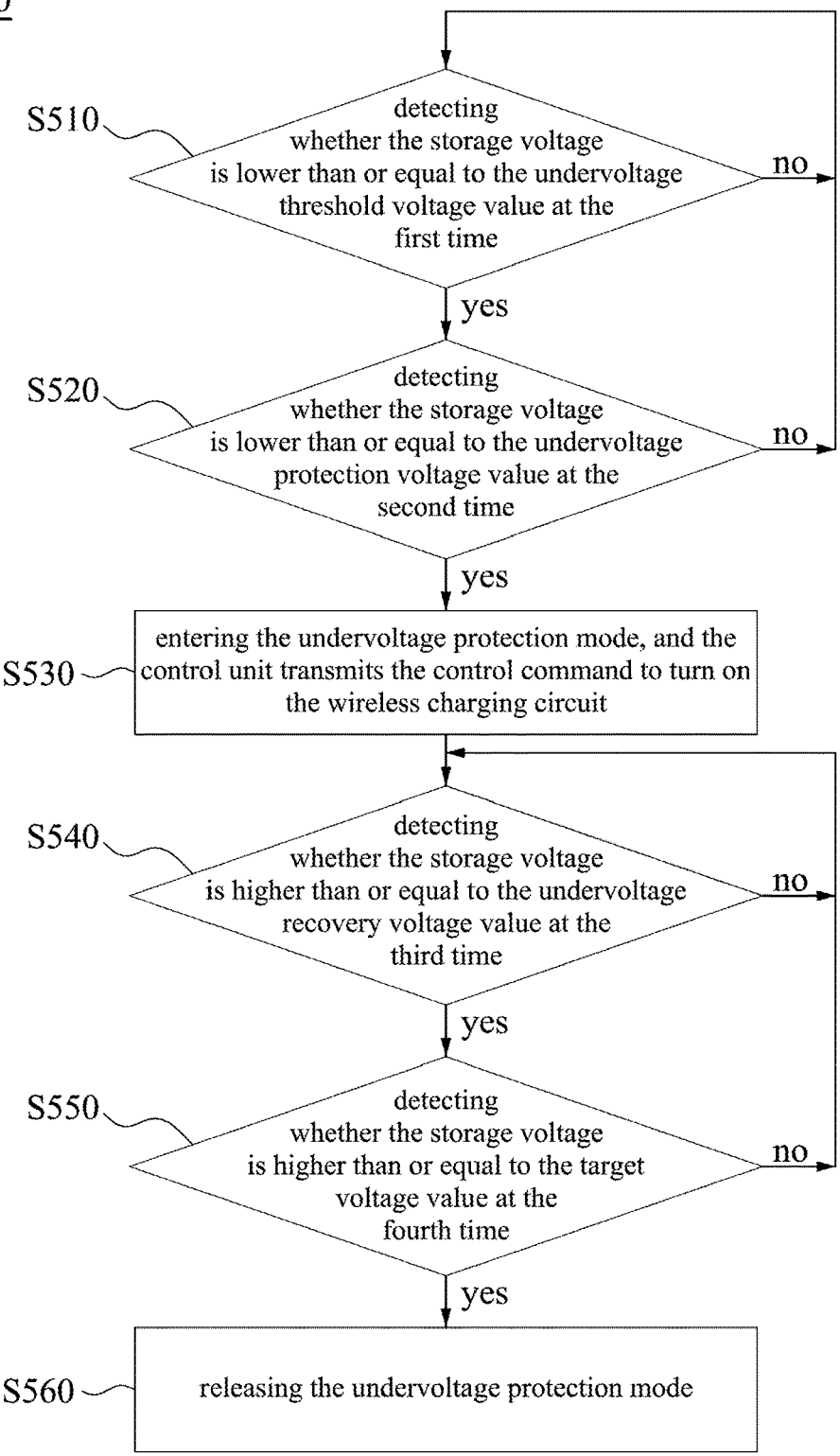
FIG. 5 is a flowchart illustrating an undervoltage projection method in some embodiments of the present disclosure.

FIG. 5 is a flowchart illustrating an undervoltage projection method in some embodiments of the present disclosure. For convenience of explanation, the undervoltage protection method 500 will be described with reference to the aforementioned FIG. 1A to FIG. 3. In some embodiments, the undervoltage protection method 500 can be applied to the capacitor voltage protection and power control to improve the safety of the capacitor charging and discharging.

In step S510, the control unit 146 detects whether the storage voltage SV is lower than or equal to the undervoltage threshold voltage value UVT at the first time (time t1). If the storage voltage SV is higher than the undervoltage threshold voltage value UVT, perform step S510 again. If the storage voltage SV is lower than or equal to the undervoltage threshold voltage value UVT, perform step S520.

In step S520, the control unit 146 detects whether the storage voltage SV is lower than or equal to the undervoltage protection voltage value UVP at the second time (time t2). If the storage voltage SV is higher than the undervoltage protection voltage value UVP, perform step S510 again. If the storage voltage SV is lower than or equal to the undervoltage protection voltage value UVP, perform step S530 to enter the undervoltage protection mode.

In step S530, the control unit 146 provides the undervoltage protection, and transmits the control command flag to turn on the wireless charging circuit 130.

In step S540, the control unit 146 detects whether the storage voltage is higher than or equal to the undervoltage recovery voltage value UVR at the third time (time t3). If the storage voltage SV is lower than the undervoltage recovery voltage value UVR, perform step S540 again. If the storage voltage SV is higher than or equal to the undervoltage recovery voltage value UVR, perform step S550.

In step S550, the control unit 146 detects whether the storage voltage is higher than or equal to the target voltage value TV at the fourth time (time t4). If the storage voltage SV is lower than the target voltage value TV, perform step S540 again. If the storage voltage SV is higher than or equal to the target voltage value TV, perform step S560 to release the undervoltage protection mode.

In step S560, the control unit 146 releases the undervoltage protection.

The above operations of the overvoltage protection method 400 and the undervoltage protection method 500 are merely examples, and are not limited to be performed in the order in the present disclosure. Without departing from the operation method of the embodiments of the present disclosure, the various operations under the control method can be appropriately added, replaced, omitted or performed in different orders.

In summary, the electronic device 100 provided by some embodiments of the present disclosure is used to hold the external electronic device 190, and is compatible with the program of different voice assistant functions for wireless transmission with each other. Accordingly, without the direct operation of the external electronic device 190, a voice-controlled service is provided and the convenience of use is improved. The present disclosure uses the wireless charging circuit of the electronic device 100 and a super capacitor to receive electric power from the external electronic device 190, so that the electronic device 100 does not need to be equipped with a battery to effectively save space and reduce costs. In addition, a voltage protection mechanism with a threshold voltage value, a protection voltage value, a recovery voltage value and the target voltage value will ensure that the power is in a working range to effectively improve power management.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An electronic device, comprising:
    a case body configured to hold an external electronic device, wherein the external electronic device is configured to perform a program to perform an operation in response to a voice command;
    a wireless transmission circuit arranged on the case body, and configured to wirelessly connect to the external electronic device;
    a voice processing circuit arranged on the case body, wherein the voice processing circuit is configured to generate the voice command according to a voice signal, and the voice command is transmitted by the wireless transmission circuit to the external electronic device;
    a control circuit arranged on the case body; and
    a wireless charging circuit arranged on the case body, coupled to the external electronic device to receive a first voltage, and configured to convert the first voltage to a storage voltage to supply power to the control circuit, the wireless transmission circuit and the voice processing circuit, wherein the control circuit is configured to control the wireless charging circuit according to the storage voltage and a load of the wireless transmission circuit and the voice processing circuit.

2. The electronic device of claim 1, wherein the control circuit comprises:
a control unit configured to detect the storage voltage and generate a control command to turn on or turn off the wireless charging circuit;
a voltage protection circuit configured to turn off the wireless charging circuit when an overvoltage protection provided by the control unit fails; and
a voltage regulation circuit configured to operate in a low power mode or a normal mode according to the load to regulate the storage voltage to supply power to the wireless transmission circuit and the voice processing circuit, wherein power of the voltage regulation circuit operating in the low power mode is lower than power of the voltage regulating circuit operating in the normal mode.

3. The electronic device of claim 2, wherein the wireless charging circuit comprises:
a capacitor;
a rectifier circuit configured to rectify the first voltage into a second voltage; and
a switching circuit configured to be turned on according to the control command to charge the capacitor with the second voltage and generate the storage voltage.

4. The electronic device of claim 2, wherein when the control unit detects the storage voltage is higher than or equal to an overvoltage threshold voltage value at a first time, the control unit detects the storage voltage again at a second time, and a first delay time is between the first time and the second time.

5. The electronic device of claim 4, wherein when the control unit detects the storage voltage is higher than or equal to an overvoltage protection voltage value at the second time, the control unit transmits the control command to turn off the wireless charging circuit to provide the overvoltage protection, and the overvoltage protection voltage value is larger than the overvoltage threshold voltage value.

6. The electronic device of claim 4, wherein when the control unit detects the storage voltage is lower than or equal to an overvoltage recovery voltage value at a third time, the control unit detects the storage voltage again at a fourth time, a second delay time is between the third time and the fourth time, and the third time is after the second time.

7. The electronic device of claim 6, wherein when the control unit detects the storage voltage is lower than or equal to a target voltage value at the fourth time, the control unit releases the overvoltage protection, and the overvoltage recovery voltage value is higher than the target voltage value.

8. The electronic device of claim 2, wherein when the control unit detects the storage voltage is lower than or equal to an undervoltage threshold voltage value at a first time, the control unit detects the storage voltage again at a second time, and a first delay time is between the first time and the second time.

9. The electronic device of claim 8, wherein when the control unit detects the storage voltage is lower than or equal to an undervoltage protection voltage value at a second time, the control unit transmits the control command to turn on the wireless charging circuit to provide an undervoltage protection, and the undervoltage threshold voltage value is larger than the undervoltage protection voltage value.

10. The electronic device of claim 9, wherein when the control unit detects the storage voltage is higher than or equal to an undervoltage recovery voltage value at a third time, the control unit detects the storage voltage again at a fourth time, a second delay time is between the third time and the fourth time, and the third time is after the second time.

11. The electronic device of claim 10, wherein when the control unit detects the storage voltage is higher than or equal to a target voltage value at the fourth time, the control unit releases the undervoltage protection, and the undervoltage recovery voltage value is lower than the target voltage value.

12. A control method, comprising:
wirelessly connecting to an external electronic device by a wireless transmission circuit, wherein the external electronic device is configured to perform a program to perform an operation in response to a voice command;
generating the voice command according to a voice signal by a voice processing circuit, and transmitting the voice command to the external electronic device by the wireless transmission circuit;
coupling to the external electronic device by a wireless charging circuit to receive a first voltage, and converting the first voltage to a storage voltage to supply power to a control circuit, the wireless transmission circuit and the voice processing circuit; and
controlling the wireless charging circuit by the control circuit according to the storage voltage and a load of the wireless transmission circuit and the voice processing circuit, wherein the wireless transmission circuit, the voice processing circuit, the wireless charging circuit and the control circuit are arranged on a case body, and the case body is configured to hold the external electronic device.

13. The control method of claim 12, wherein the control circuit comprises a control unit, a voltage protection circuit and a voltage regulation circuit, and controlling the wireless charging circuit by the control circuit according to the storage voltage and the load of the wireless transmission circuit and the voice processing circuit comprises:
detecting the storage voltage by the control unit, and generating a control command to turn on or turn off the wireless charging circuit;
turning off the wireless charging circuit by the voltage protection circuit when an overvoltage protection provided by the control unit fails; and
operating in a low power mode or a normal mode according to the load by a voltage regulation circuit to regulate the storage voltage to supply power to the wireless transmission circuit and the voice processing circuit, wherein the power of the voltage regulation circuit operating in the low power mode is lower than the power of the voltage regulation circuit operating in the normal mode.

14. The control method of claim 13, wherein when the control unit detects the storage voltage is higher than or equal to an overvoltage threshold voltage value at a first time, the control unit detects the storage voltage again at a second time, and a first delay time is between the first time and the second time.

15. The control method of claim 14, wherein when the control unit detects the storage voltage is higher than or equal to an overvoltage protection voltage value at the second time, the control unit transmits the control command to turn off the wireless charging circuit to provide the overvoltage protection, and the overvoltage protection voltage value is larger than the overvoltage threshold voltage value.

16. The control method of claim 14, wherein when the control unit detects the storage voltage is lower than or equal to an overvoltage recovery voltage value at a third time, the control unit detects the storage voltage again at a fourth time, a second delay time is between the third time and the fourth time, and the third time is after the second time.

17. The control method of claim 16, wherein when the control unit detects the storage voltage is lower than or equal to a target voltage value at the fourth time, the control unit releases the overvoltage protection, and the overvoltage recovery voltage value is higher than the target voltage value.

18. The control method of claim 13, wherein when the control unit detects the storage voltage is lower than or equal to an undervoltage threshold voltage value at a first time, the control unit detects the storage voltage again at a second time, and a first delay time is between the first time and the second time.

19. The control method of claim 18, wherein when the control unit detects the storage voltage is lower than or equal to an undervoltage protection voltage value at the second time, the control unit transmits the control command to turn on the wireless charging circuit to provide an undervoltage protection, and the undervoltage threshold voltage value is larger than the undervoltage protection voltage value.

20. The control method of claim 19, wherein when the control unit detects the storage voltage is higher than or equal to an undervoltage recovery voltage value at a third time, the control unit detects the storage voltage again at a fourth time, a second delay time is between the third time and the fourth time; when the control unit detects the storage voltage is higher than or equal to a target voltage value at the fourth time, the control unit releases the undervoltage protection, and the undervoltage recovery voltage value is lower than the target voltage value.

\* \* \* \* \*